United States Patent [19]

Lee-Wai-Yin

[11] Patent Number: 6,167,387
[45] Date of Patent: Dec. 26, 2000

[54] CASHLESS CARD REVALUE SYSTEM

[75] Inventor: Michael Lee-Wai-Yin, Mississauga, Canada

[73] Assignee: Coinamatic Canada Inc., Mississauga, Canada

[21] Appl. No.: 09/065,624

[22] Filed: Apr. 24, 1998

[30] Foreign Application Priority Data

Sep. 16, 1997 [CA] Canada .................................. 2215543

[51] Int. Cl.[7] .......................................................... G06F 17/60
[52] U.S. Cl. ................................ 705/41; 705/17; 705/39; 235/379
[58] Field of Search ................................ 705/17, 39, 41; 235/379

[56] References Cited

U.S. PATENT DOCUMENTS

| | | | |
|---|---|---|---|
| 4,629,874 | 12/1986 | Pugsley et al. | 235/380 |
| 4,731,575 | 3/1988 | Sloan | 324/113 |
| 4,795,892 | 1/1989 | Gilmore et al. | 235/381 |
| 5,221,838 | 6/1993 | Gutman et al. | 235/379 |
| 5,225,977 | 7/1993 | Hooper et al. | 705/41 |
| 5,285,382 | 2/1994 | Muehlberger et al. | 705/17 |
| 5,380,991 | 1/1995 | Valencia et al. | 235/383 |
| 5,450,477 | 9/1995 | Amarant et al. | 379/91.02 |
| 5,475,585 | 12/1995 | Bush | 705/26 |
| 5,511,114 | 4/1996 | Stimson et al. | 379/114 |
| 5,557,516 | 9/1996 | Hogan | 705/41 |
| 5,577,109 | 11/1996 | Stimson et al. | 379/112 |
| 5,590,038 | 12/1996 | Pitroda | 705/41 |
| 5,644,118 | 7/1997 | Hayashida | 235/379 |
| 5,704,046 | 12/1997 | Hogan | 705/39 |
| 5,991,747 | 11/1999 | Tomoyuki et al. | 705/41 |

FOREIGN PATENT DOCUMENTS

0724238A1 7/1996 European Pat. Off. .......... G07F 7/10

OTHER PUBLICATIONS

Reistad joins PSDC to market prepaid cards for college communities across nationCard news, v5, n20, p. 4(2) Oct. 1990.

Fehr–Snyder Kerry; Phoenix Firm to Install Smart–Card System at Honolulu Air base, Arizona Republic, Nov. 21, 1997.

Hutton David, "Smart Cards", Bank Marketing, Feb. 1998, p. 41–46.

*Primary Examiner*—Tod R. Swann
*Assistant Examiner*—Jagdish Patel
*Attorney, Agent, or Firm*—Orange & Chari

[57] ABSTRACT

This invention concerns a cashcard system for purchasing laundry services wherein the user is issued with a cashcard and a personal identification number. Each of the laundry facilities is provided with a terminal having means for verifying the user, means for verifying the card, means for updating the card with an amount requested by the user, means for saving the card identification and the amount revalued to the card and means for storing and forwarding at a later time the amounts revalued to the cards for credit verification by a central computer remote to the terminal. In addition, the terminal in verifying the card compares the card to a previously rejected cards before updating the card with a new amount requested.

18 Claims, 5 Drawing Sheets

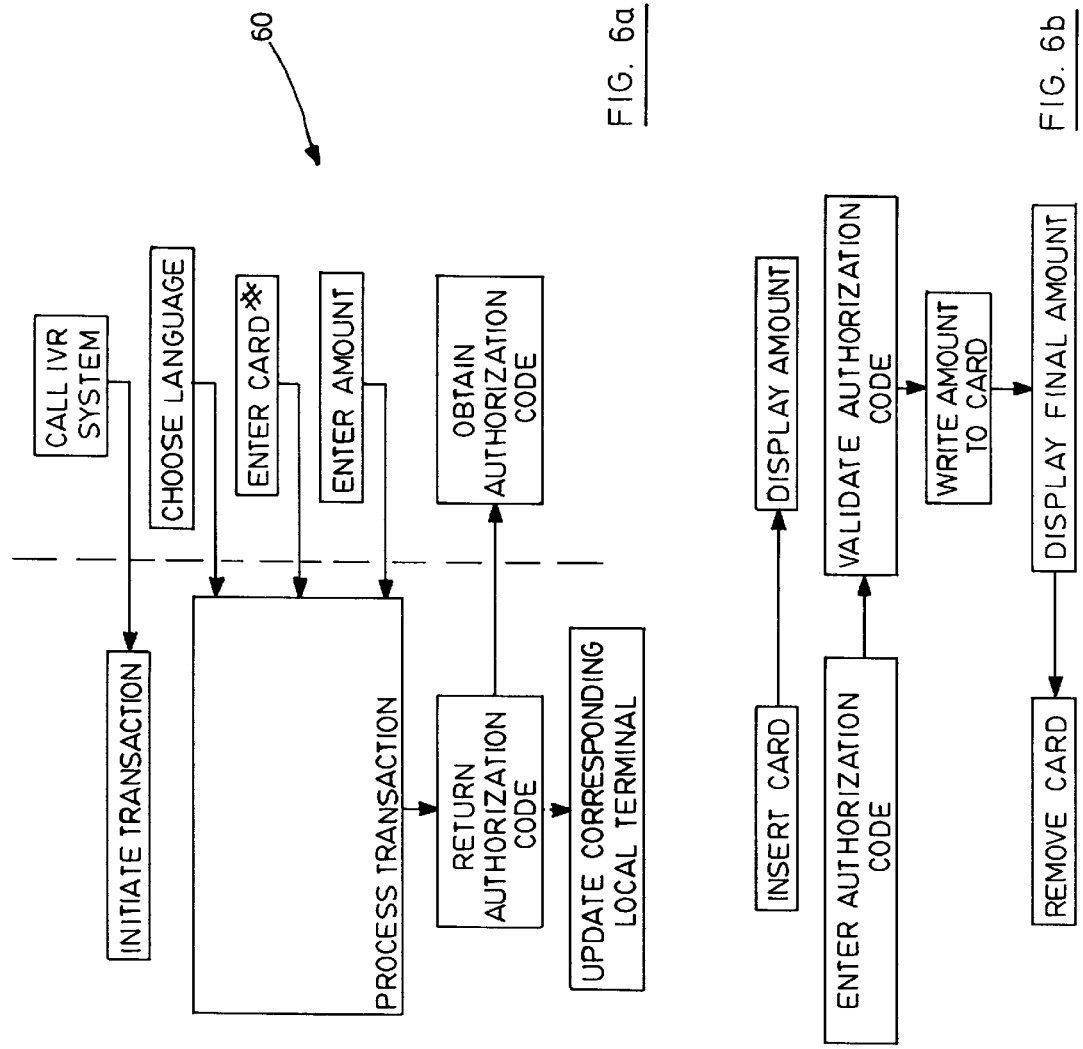

CASHLESS CARD REVALUE SYSTEM

The present invention relates generally to a payment and metering system for a commodity or utility service and in particular to a method and apparatus for the prepayment and metering of such a commodity or service.

BACKGROUND OF THE INVENTION

Traditional utility services such as laundry service devices or public laundry facilities are typically activated by payment coins which are collected at each laundry machine individually. A user must obtain a sufficient number of coins of the correct denomination to activate the machine for a washer or dryer load. Many public laundry facilities provide bill changers which accept currency bills and dispense coins for the convenience of the users. Fundamentally, this system presents at least two distinct disadvantages.

The first disadvantage of the above system is to the user. The user generally has to have a sufficient number of coins on hand. The second disadvantage is to the collector or owner of the laundry facility who is required to empty the coin collectors in each of the machines. Furthermore, if these coins are not collected at regular intervals this provides a temptation to potential vandalism or theft. In addition the bill changers are also prone to vandalism and theft since a large number of coins must be stocked in the bill changers. This also ties up operating capital for the owner of the facility. Furthermore the operator of the facility must employ a trustworthy person to make frequent collections of the accumulated coins and bills, and the task of counting the coins is time consuming.

In anticipation of these disadvantages various systems have been devised for purchasing such services without requiring the exchange or collection of coins at the service device.

For example in U.S. Pat. No. 5,225,977 a card payment system for service dispensing devices is described. Therein, a user is provided with a mag-strip card on which a particular type of service, which has been previously purchased, is encoded by way of a cash transaction. In this system a local controller, which may not necessarily be located with the service devices, is connected to the laundry service devices and a central controller. The local controller and the central controller are connected together for the transfer of information between them. The laundry facility provides a card dispenser which includes a bill acceptor slot and a card reader. In order for the user to add value to the card a currency bill is inserted into the bill acceptor. A corresponding amount is then recorded on the card for use in the laundry machine. This system has a disadvantage in that once the user has obtained a valid card and the card is inserted in the local controller an authorization request must be transmitted to the central controller where it accesses an accounts database to receive and transmit an authorization message to the local controller. Thus a disadvantage of the system is that both the local controller and the central controller have to be in constant communication. This is quite unfeasible in situations where there is a large number of laundry or service facilities to be monitored or operated. Furthermore, it is inconvenient for the user to always attend at a central controller location in order to add a new value to their cash card. A further disadvantage of the system is that each laundry device is in communication with the local controller thus providing less flexibility in the location of the devices.

In U.S. Pat. No. 5,475,585 a transactional processing system is disclosed. This patent concerns a real time transaction processing system for eliminating batch or interactive billing processes with the vendor or service provider. This patent is specifically concerned with billing and purchasing of pay-per-view television programming and is not directly applicable to the purchasing of services in a multi-device situation.

Thus none of the systems to date mitigate the disadvantages discussed above in an effective and affordable prepaid metering system.

SUMMARY OF THE INVENTION

In accordance with this invention there is provided a cashless card revalue system for use with a card having a recording medium of the kind permitting recording and erasure of information thereon, the system comprising a central computer for registering banking or credit card information pertaining to a user of the card, memory for storing card numbers and the corresponding banking or credit card information; a terminal located at a service facility premises and including an input device for receiving the card, a first verifier for verifying the card user memory for saving the card number and an entered amount, memory for storing a list of rejected transactions, a second verifier for verifying the card, a recorder for updating the card with the entered amount in response to a valid card verification and a transmitter for transmitting the contents of the memory to the central controller.

In accordance with a further aspect of this invention, there is provided a method of prepaying for a utility service at an electronic terminal for use with a card having a unique identification and having a recorder for permitting recording and erasure of information thereon, said method comprising the steps of:

(a) receiving and reading the card by the terminal;
(b) verifying a user of the card;
(c) storing the card identification and transaction amount in a memory means;
(d) verifying the card by comparing the card identification to a list of previously rejected cards to thereby reject the card as a result of the card being previously rejected;
(e) updating the card with the transaction amount upon the card being accepted the transaction amount being less that a predetermined value; and
(f) transmitting the transaction amount and the card identification stored in the memory to the central computer at a predetermined time for verifying the transaction and for updating the list of previously rejected cards.

In accordance with a further aspect of the invention a prepaid card system to enable users to recharge cards at a service facility in order to use such cards to purchase services at a said facility comprising:

(a) a plurality of cards, each having a unique identification associated therewith;
(b) a central computer for providing financial verification and credit transactions;
(c) a plurality of terminals located at the service facilities remote from the central computer, each terminal including:
   (a) an input device for receiving and reading the card;
   (b) for verifying a card user;
   (c) memory for storing the card identification and a transaction amount;
   a verifier for verifying the card by comparing rejected card identifications to the currently read card identification and rejecting the card as a result of the card being previously rejected;

(e) a recorder for updating the card with the transaction amount upon the card being accepted, said transaction amount being less than a predetermined amount; and (f) a transmitter for transmitting the contents of the memory means to the central computer at predetermined time periods whereat the current transaction may be verified by the central computer against each of the users credit information and receiving an updated list of rejected cards in response to the verification thereby limiting the recharge value extended by the terminal to a predetermined amount for each transaction.

BRIEF DESCRIPTION OF THE DRAWINGS

In order that the invention may be better understood examples of systems embodying the invention will now be described with reference to the accompanying drawings in which:

FIGS. 6(a) and 6(b) are flowcharts showing the process of using the system according to one embodiment of the invention.

DETAILED DESCRIPTION OF A PREFERRED EMBODIMENT

Figure 1:
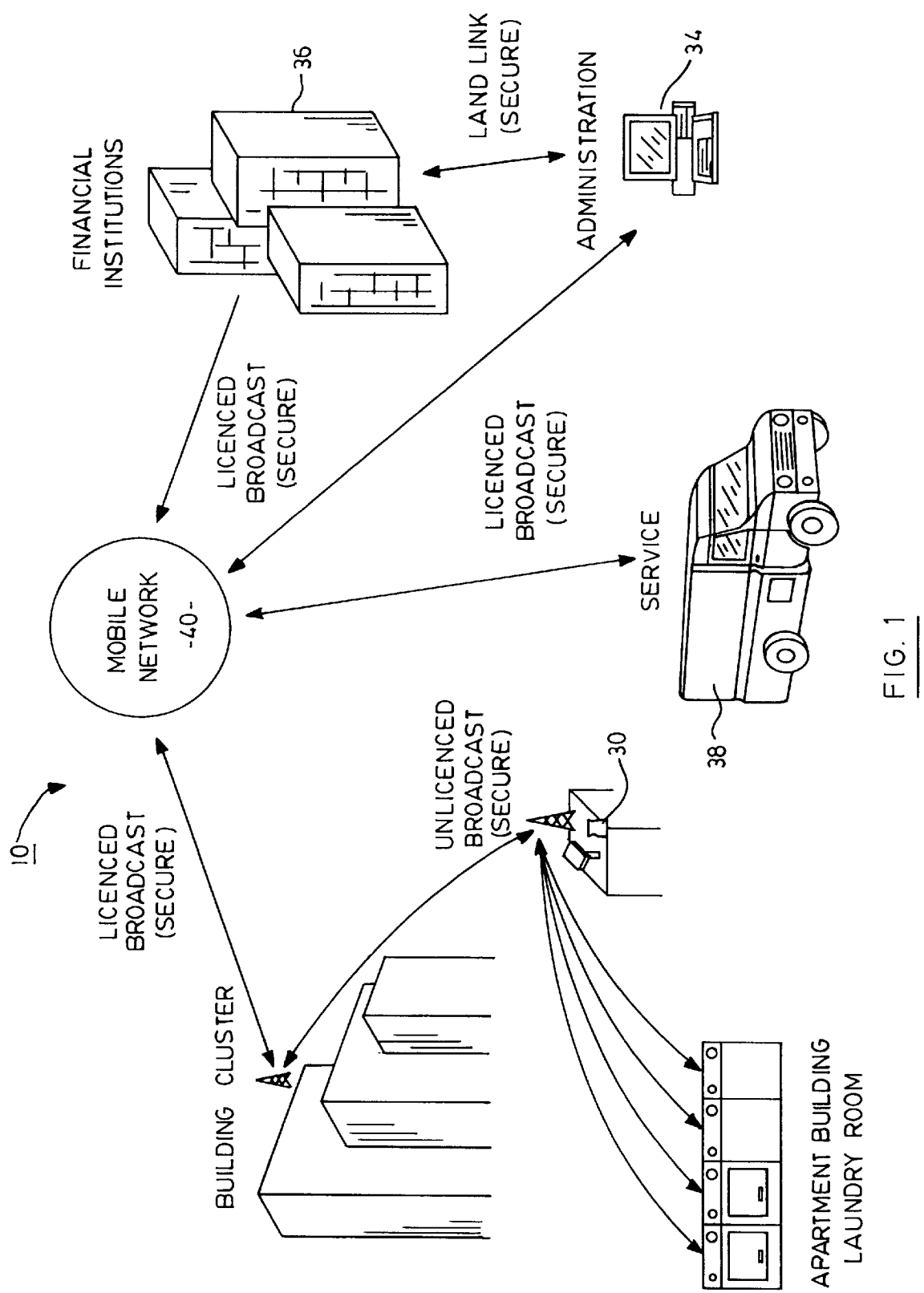
FIG. 1 shows a general system overview of a cashless card revalue system according to the present invention.

Referring now to FIG. 1 an overview of a system according to the present invention is shown generally by 10. The system employs in each location or building cluster a laundry service comprising one or more laundry machines. For the purposes of this description each of these locations will be referred to as a "service facility". Furthermore it is assumed that each of the laundry machines includes a card reader and is operating by insertion of a card into the reader to provide payment for the laundry service. The cards are typically of the type to be described below. A terminal 30 is located at each of these service facilities which communicates via a mobile or broadcast network or a dial-up line to a central controller located either at the service providers administrative offices 34 or a central controller located at the financial institution 36. The central controller 34 also communicates via suitable communication channels to the financial institutions 36. A mobile service unit 38 is also capable of communicating to both the terminals 30 via a mobile network 40 or the central controllers 34 or 36.

Figure 2:
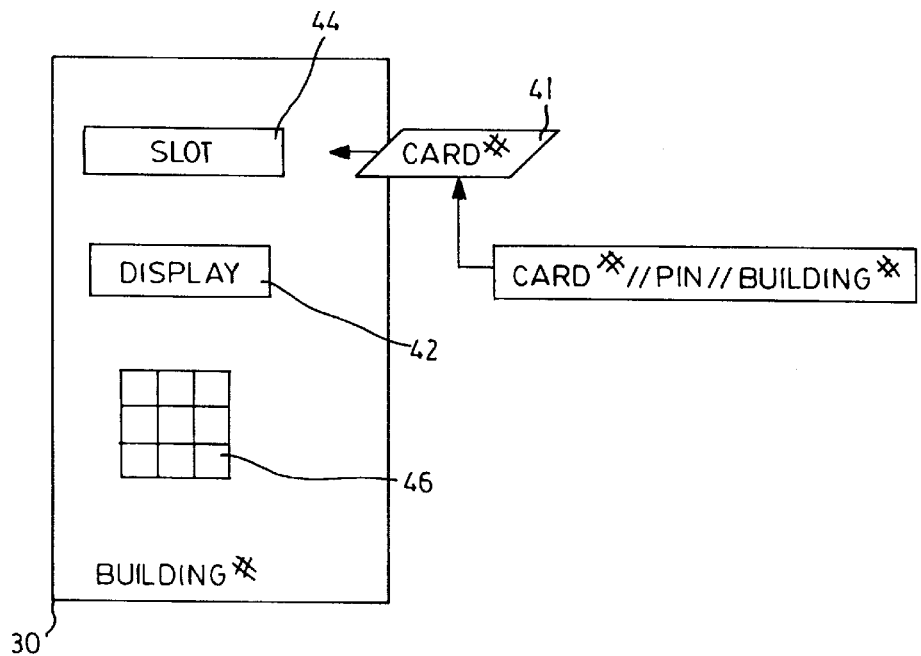
FIG. 2 is an exterior view of a terminal unit.
Figure 3:
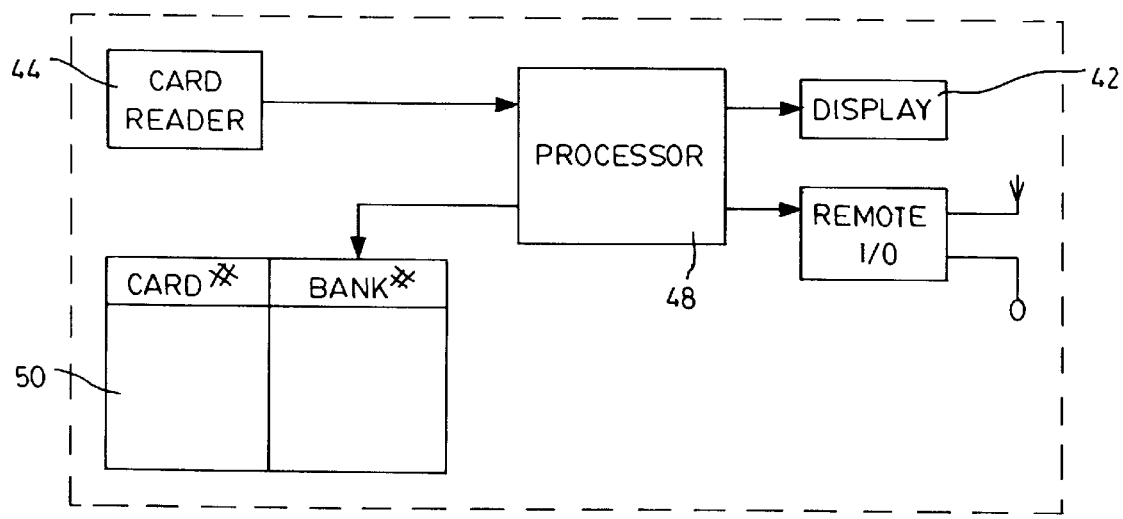
FIG. 3 is a functional block diagram of the terminal according to the present invention.

Turning now to FIG. 2 the terminals 30 include a display 42, a card reader 44 and a keyboard 46. Each terminal 30 is also identified by a unique service facility identification or building number. Users of the system are issued with a cashcard 41 which may be a mag-strip card or "smart" card. Each card may have a unique identification number associated therewith. The card identification may also include a user's P.I.N. and the building number in addition to the card identification number. Referring to FIG. 3 the terminal 30 also includes a processor 48 for controlling the card reader 44, the display 42 and remote I/O 46. A memory 50 for storing amongst others a table of card numbers and amounts and such like. A dial-up or wireless modem 51 for communicating information from the terminal to the central computer is also provided.

Figure 4:
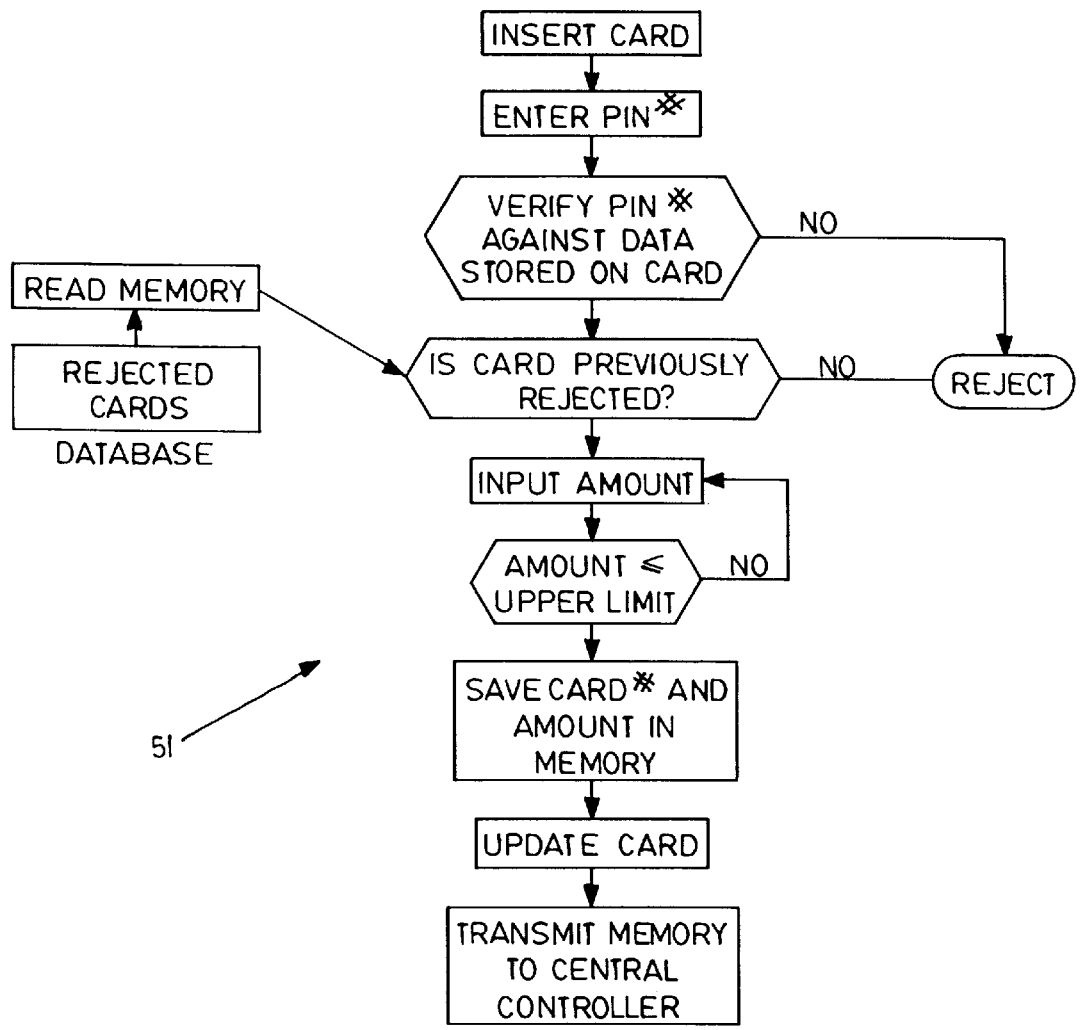
FIG. 4 is a flowchart showing a method of recharging a card according to an embodiment of the present invention.

Turning now to FIG. 4, a flow diagram of the operation performed by a user for recharging a card is shown generally by numeral 51. When a user desires to recharge the card with a predetermined amount for purchase of the specific services, the user inserts the card into the card slot 44 at the terminal 30. The user then enters a personal identification number (P.I.N.) on the keyboard 46. This P.I.N. number is verified against data stored on the card and by the terminal reading the information stored on the card when the card is inserted in the terminal. If the P.I.N. number does not verify against the data stored on the card, i.e. the user is not verified, then the card is rejected. However if the user verification step is successful then the terminal processor 48 retrieves from its database a list of previously rejected cards. This is compared to the currently entered card identification numbers to determine whether this card was previously rejected. If the currently inserted card is accepted the user is allowed to enter a transaction amount via the keyboard 46. The input amount is compared to an upper limit which is predetermined by the terminal. If the amount entered is within the upper limit then the terminal saves the card identification number and updates the card with the entered amount. The amount may also be displayed on the terminal at display 42. It may thus be seen that the terminal stores a number of transactions in a given period typically during the course of a day and then subsequently forwards these stored transactions to a central computer for verification and authorization. At the central computer these transactions are either accepted or rejected and the rejected transactions are retransmitted back to the appropriate terminal and added to the rejected cards database.

Figure 5:
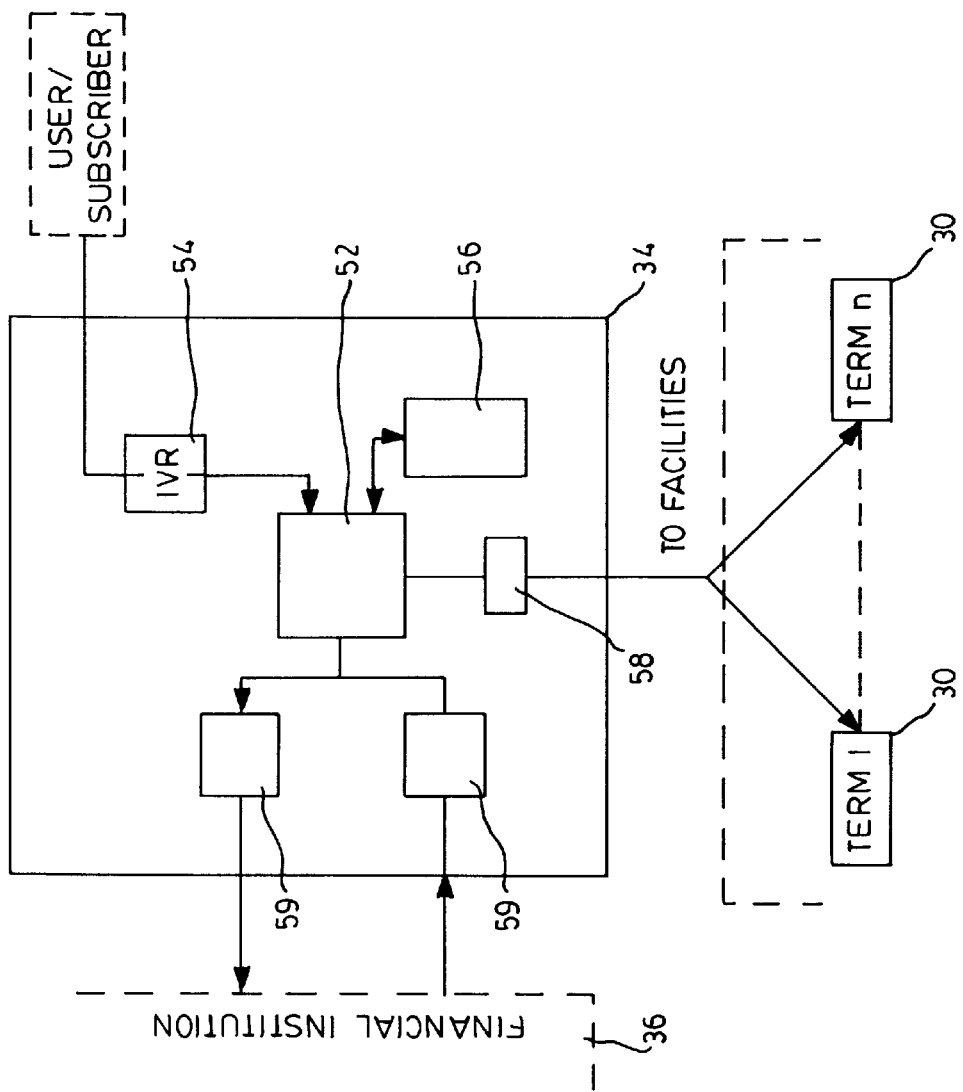
FIG. 5 is a block diagram of a central controller.

Referring now to FIG. 5, one embodiment of the central computer 34 includes a central processor 52 which connects to an interactive voice response (IVR) unit 54. In addition the central processor 52 is connected to a database 56 for storing amongst others various banking, credit and user information. A communications interface 58 connected to the central controller 52 provides either telephone or RF communication to the terminals 30 located at each of the service facilities. A secure interface connector 59 is provided from the central processor 52 to the financial institutions 36 for downloading relevant banking and receiving relevant authorization and account information from the financial institutions 36. In a further embodiment (not shown) of the invention, the central controller may be located within a financial institution and this communicates directly with the terminals 30. Furthermore in this embodiment described, the IVR unit 54 is optional, and other apparatus known in the art may be used to obtain banking, credit or authorization information from a user.

Referring to FIGS. 6(a) and 6(b) is another embodiment showing the sequence: of steps for the system and is indicated generally by numeral 60. As may be seen, the system operates on a two-step authorization process. The user of the system is provided with a value card having a unique identification code thereon. A unique feature of the system is the revaluing of the card by using a "store and forward" device which stores card reloads without immediately connecting to or being on-line with a bank or other financial institution such as a credit card company. Thus the system is unique in that it provides security to the transaction similar to a bank however it limits its liability and stores the identity of any of the cards for which it does not wish to permit a revalue in a manner as will be explained below.

As outlined earlier the system employs in each location a wall-mounted value terminal. A tenant inserts the card in the card reader slot 44 of terminal 30 and enters the P.I.N. number via the keyboard 46. The processor 48 performs an encryption process by combining in an algorithm the card number, the building number and the users P.I.N. and sends the code number to the card. The card takes that code number and calculates a key number. The card then sends the key number back to the wall terminal which compares the key to an encrypted code on the card, if it matches, the terminal checks the amount entered by the user via the keyboard 46. If in a previous transaction the user had been rejected by the authorizing institution, for example if the credit extended in a previous transaction exceeded the credit limit allowed by the financial institution, the terminal rejects further revalue of the card. The user is informed by a reject message being displayed on the terminal display 42 or by an audible sound. If the requested amount has not been rejected the processor unlocks the card and places value onto the card. It can also be used to place additional value on the card for refunds. This amount is then saved along with the card number in the terminal's database memory for eventual uploading to the central computer or financial institution at a suitable time. Once the card has been revalued with the required amount it may be used in the appropriate machine at the service facility, whereby the machine decreases the amount on the card in accordance with the cost of a laundry cycle purchased.

Each night the wall terminal down-loads its transactions to the central computer. The central computer access is initiated to pre-authorized bank accounts or credit cards. If any payment demand is declined a list of declined cards or transactions is created for that building and is down-loaded to the appropriate terminal located in that building. When the user wishes to further revalue their card such a revalue is then denied. Thus the central facility is exposed to only the loss of at most a single day's credit value, for example $30.00 or $50.00. The credit department of the central administration facility notifies the rejected card tenants that further use of the card is blocked until the non-payment is cleared. In the alternative, a tenant could call a "1-900" number in order to reactivate and revalue the card.

As seen in FIG. 2, in one embodiment, each resident or user is issued a uniquely identifiable smartcard with a unique code number printed on the outer surface of the card. Prior to use of the card each user is required to register with the central computer predetermined banking information including authorization for the central computer operator to perform either debit or credit transactions on their bank accounts or credit card accounts.

Alternatively, when a user wishes to add value to their card a revalue sequence is initiated by the user dialing a "1-800" number to connect with an interactive voice response program (IVR) to obtain authorization for the revalue. The IVR steps the resident through a series of choices and actions. The user is presented with a choice of selecting one of many languages such as English, French, Italian and suchlike. Next the user enters the unique card ID and a desired reload value in pre-determined denominations.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

The embodiments of the invention in which an exclusive property or privilege is claimed are defined as follows:

1. An electronic cashcard terminal generally located at a service facility, said terminal for prepaying for a utility service for use with a card having a unique identity and capable of permitting recording and erasure of information thereon, said terminal comprising:
   (a) an input device for receiving and reading said card;
   (b) a verifier for verifying a card user;
   (c) memory for storing said card identification and a transaction amount;
   (d) a second verifier for verifying said card by comparing rejected card identifications with said currently read card identification and rejecting said card upon said card being previously rejected;
   (e) a recorder for updating said card with said transaction amount upon said card being accepted, and said transaction amount being less than a predetermined amount; and
   (f) a transmitter for transmitting said contents of said memory to said central computer at predetermined time periods, whereat said previously performed transaction may be verified by said central computer each against said user's credit information and providing an updated list of rejected cards in response to a failure to verify thereby limiting the credit extended by said terminal to a predetermined amount for each card.

2. A terminal as defined in claim 1 said transmitter including a modem.

3. A terminal as defined in claim 2 said modem being a wireless modem.

4. A terminal as defined in claim 1, including a user interface for entering said transaction amount.

5. A terminal as defined in claim 1 said card being an electronic smart card.

6. A terminal as defined in claim 1, said first verifier for verifying said card user including a keyboard for input of a users personal identification number (P.I.N.).

7. A terminal as defined in claim 1 including display for displaying said transaction an amount.

8. A terminal as defined in claim 1, said tern including memory for storing a unique service facility identification.

9. A terminal as defined in claim 8, said card identification being a concatenation of said users personal identification number and said service facility identification.

10. A method of prepaying for a utility service at an electronic terminal for use with a card having unique identification and having a recorder for permitting recording and erasure of information thereon, said method comprising the steps of:
   (a) receiving and reading said card by said terminal;
   (b) verifying a user of said card;
   (c) storing said card identification and transaction amount in a memory;
   (d) verifying said card by comparing said card identification to a list of previously rejected cards to thereby reject said card upon said card being previously rejected;
   (e) updating said card with said transaction amount upon said card being accepted said transaction amount being less than a predetermined value; and
   (f) transmitting said transaction amount and said card identification stored in said memory to said central computer at a predetermined time for verifying said transaction and for updating said list of previously rejected cards.

11. A prepaid card system for enabling users to prepay a card for a utility service at a service facility to use such cards to purchase services at a said facility comprising:
(a) a plurality of cards, each having a unique identification associated therewith;
(b) a central computer for providing financial verification and credit transactions;
(c) a plurality of terminals located at said service facilities remote from said central computer, each said terminal including:
  (i) an input device for receiving and reading said card;
  (ii) a first verifier for verifying a card user;
  (iii) memory for storing said card identification and a transaction amount
  (iv) a second verifier for verifying said card by comparing rejected card identifications with said currently read card identification and rejecting said card upon said card being previously rejected;
  (v) a recorder for updating said card with said transaction amount upon said card being accepted, said transaction amount being less than a predetermined amount; and
  (vi) a transmitter for transmitting said contents of said memory to said central computer at predetermined time periods whereat said current transaction may be verified by said central computer each against said users credit information and providing an updated list of rejected cards in response to said verification thereby limiting the credit extended by said terminal to a predetermined amount for each transaction.

12. A system as defined in claim 11, said card being an electronic smartcard.

13. A system as defined in claim 11 said transmitter for transmitting said contents of said memory means including a modem.

14. A system as defined in claim 11 said modem being a wireless modem.

15. A system as defined in claim 11, said terminal including a user interface for entering said transaction amount.

16. A system as defined in claim 11 said terminal including means for limiting said transaction amount to a predetermined amount.

17. A system as defined in claim 12, said terminal including a display for displaying said transaction amount.

18. An electronic cashcard terminal generally located at a service facility, said terminal for prepaying for a utility service for use with a card having a unique identity and capable of permitting recording and erasure of information thereon, said terminal comprising:
(a) an input device for receiving and reading said card;
(b) a first verifier for verifying a card user;
(c) a first memory for storing said card identification and a transaction amount;
(d) a second verifier for verifying said card by comparing rejected card identifications with said currently read card identification and rejecting said card upon said card being previously rejected;
(e) a recorder for updating said card with said transaction amount upon said card being accepted, and said transaction amount being less than a predetermined amount; and
(f) a transmitter for transmitting said contents of said memory to said central computer at predetermined time periods, whereat said previously performed transaction may be verified by said central computer each against said users credit information the providing an updated list of reject cards in response to a failure to verify thereby limiting the credit extended by said terminal to a predetermined amount for each card;
(g) a second memory for storing a unique service facility identification; and
wherein said card identification is a concatenation of said user's personal identification number and said service facility identification.

* * * * *